(12) United States Patent
Liu et al.

(10) Patent No.: US 11,330,484 B2
(45) Date of Patent: May 10, 2022

(54) METHOD AND DEVICE FOR ACQUIRING TERMINAL CAPABILITY, AND COMPUTER STORAGE MEDIUM

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/952,690

(22) Filed: Nov. 19, 2020

(65) Prior Publication Data

US 2021/0076274 A1     Mar. 11, 2021

Related U.S. Application Data

(63) Continuation of application No. PCT/CN2019/089546, filed on May 31, 2019.

(30) Foreign Application Priority Data

May 31, 2018  (CN) .................. 201810553084.X

(51) Int. Cl.
  *H04W 36/00*   (2009.01)
  *H04W 8/24*    (2009.01)
  *H04W 8/22*    (2009.01)

(52) U.S. Cl.
  CPC ......... *H04W 36/0079* (2018.08); *H04W 8/22* (2013.01); *H04W 8/24* (2013.01); *H04W 36/0016* (2013.01)

(58) Field of Classification Search
  CPC ...... H04W 8/24; H04W 8/22; H04W 36/0016; H04W 36/0033
  See application file for complete search history.

(56) References Cited

U.S. PATENT DOCUMENTS

2013/0178214 A1   7/2013   Zhang et al.
2019/0110190 A1*  4/2019   Van Lieshout ....... H04L 67/303

FOREIGN PATENT DOCUMENTS

| CN | 102448131 A | 5/2012 |
| CN | 103108367 A | 5/2013 |
| CN | 103533587 A | 1/2014 |

OTHER PUBLICATIONS

SAMSUNG: "Use of identifier representing NR UE capabilities, baseline", R2-1805613, XP051429256, Apr. 14, 2018. 4 pages. (Year: 2018).*
SAMSUNG: "Use of identifier representing NR UE capabilities, baseline", R2-1805613, XP051429256, Apr. 14, 2018. 5 pages.
Supplementary European Search Report in the European application No. 19810625.4, dated May 31, 2021. 8 pages.

(Continued)

*Primary Examiner* — Nam T Huynh
(74) *Attorney, Agent, or Firm* — Perkins Coie LLP

(57) ABSTRACT

A method for acquiring terminal capability includes that: a first access network device sends a first handover request message to a second access network device, the first handover request message carrying first UE capability identification information of a terminal. A device for acquiring terminal capability is also provided.

18 Claims, 7 Drawing Sheets

(56) References Cited

OTHER PUBLICATIONS

International Search Report in the international application No. PCT/CN2019/089546, dated Sep. 2, 2019.
3GPP TS 36.300 V13.2.0 (Dec. 2015), Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.306 V13.0.0 (Dec. 2015), Technical Specification Group Radio Access Network; Evolved Universal Terrestrial Radio Access (E-UTRA); User Equipment (UE) radio access capabilities (Release 13).
Written Opinion of the International Search Authority in the international application No. PCT/CN2019/089546, dated Sep. 2, 2019.
First Office Action of the European application No. 19810625.4, dated Feb. 28, 2022, 6 pages.
Office Action of the Indian application No. 202027051807, dated Dec. 29, 2021, 7 pages with English translation.

\* cited by examiner

METHOD AND DEVICE FOR ACQUIRING TERMINAL CAPABILITY, AND COMPUTER STORAGE MEDIUM

CROSS-REFERENCE TO RELATED APPLICATION

This application is a U.S. continuation application of International Application No. PCT/CN 2019/089546, entitled "METHOD AND DEVICE FOR ACQUIRING TERMINAL CAPABILITY, AND COMPUTER STORAGE MEDIUM", filed on May 31, 2019, which claims priority to Chinese Patent Application No. 201810553084.X, filed on May 31, 2018, the entire contents of which are incorporated herein by reference in their entirety.

TECHNICAL FIELD

The disclosure relates to the technical field of wireless communications, and more particularly to a method and device for acquiring terminal capability, and a computer storage medium.

BACKGROUND

At present, capability information of terminal (User Equipment (UE) capability information for short) is reported to an access network during registration or registration update, and then the access network sends the capability information of terminal to a core network for storage. When a terminal initiates a connection setup request or a connection resume request, the access network requests the capability information of terminal from the core network, and then provides corresponding configuration for the terminal according to the capability information of terminal. With more and more features supported by the terminal, there will be more and more capability information of terminal, the transmission of the capability information of terminal will result in a large signaling overhead; at the same time, the core network needs to save capability information of all terminals, which also brings great challenges to the core network.

SUMMARY

In order to solve the above technical problem, the embodiments of the disclosure provide a method and device for acquiring terminal capability, and a computer storage medium.

The method for acquiring terminal capability provided by the embodiments of the disclosure may include the following operation.

A first access network device sends a first handover request message to a second access network device, the first handover request message carrying first UE capability identification information of a terminal.

The method for acquiring terminal capability provided by the embodiments of the disclosure may include the following operation.

A second access network device receives a first handover request message from a first access network device, the first handover request message carrying first UE capability identification information of a terminal.

The device for acquiring terminal capability provided by the embodiments of the disclosure may include a transceiver.

The transceiver is configured to send the first handover request message to the second access network device, the first handover request message carrying the first UE capability identification information of the terminal.

BRIEF DESCRIPTION OF THE DRAWINGS

The accompanying drawings described here are used for providing further understanding of the disclosure, and constitute a part of the present disclosure. Schematic embodiments of the disclosure and description thereof are used for illustrating the disclosure and not intended to form an improper limit to the disclosure. In the accompanying drawings.

DETAILED DESCRIPTION

In the related art, a handover process may occur during movement of the terminal. During handover, a target network may not support optimized terminal capabilities, which results in an abnormal handover.

The embodiments of the disclosure may be applied to various communication systems, for example, the Global System of Mobile communication (GSM), a Code Division Multiple Access (CDMA) system, a Wideband Code Division Multiple Access (WCDMA) system, the General Packet Radio Service (GPRS), the Universal Mobile Telecommunication System (UMTS), a Long Term Evolution (LTE) system, and evolution systems of the LTE system like an Advanced Long Term Evolution (LTE-A) system, a New Radio (NR) system and evolution systems of the NR system, such as a NR-based access to Unlicensed spectrum (NR-U) system, or the next generation communication system.

Figure 1:
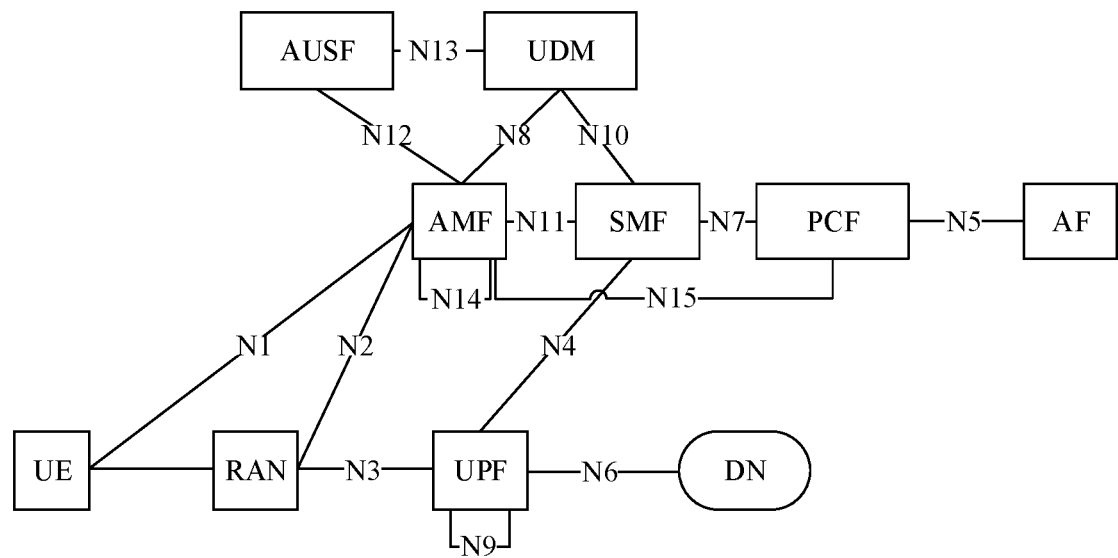
FIG. 1 is a system architecture diagram of a 5G network.

FIG. 1 is a system architecture diagram of a 5G network. As illustrated in FIG. 1, devices involved in a 5G network system include as follows.

UE, Radio Access Network (RAN), User Plane Function (UPF) entity, Data Network (DN), Core Access and Mobility Management Function (AMF) entity, Session Management Function (SMF) entity, Policy Control function (PCF) entity, Application Function (AF) entity, Authentication Server Function (AUSF) entity, and Unified Data Management (UDM) entity.

Figure 2:
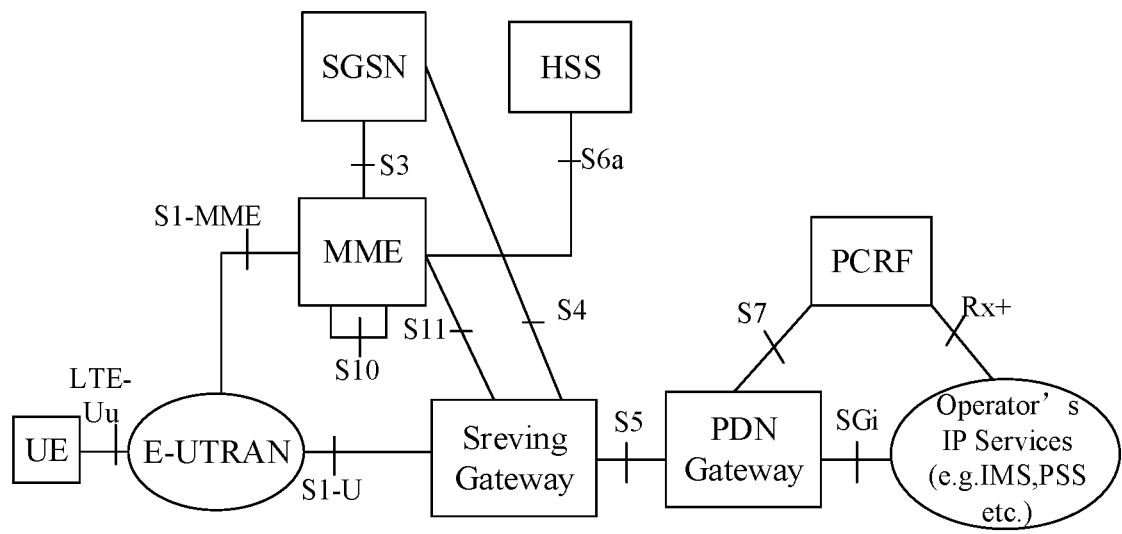
FIG. 2 is a system architecture diagram of a 4G network.

FIG. 2 is a system architecture diagram of a 4G network. As illustrated in FIG. 2, devices involved in a 4G network system include as follows.

UE, Evolved Universal Terrestrial Radio Access Network (E-UTRAN), Mobility Management Entity (MME) network element, Serving GPRS Support Node (SGSN), Home Subscriber Server (HSS), Serving Gateway (SG), Packet Data Network (PDN) gateway, and Policy and Charging Rules Function (PCRF).

The examples in FIG. 1 and FIG. 2 above are only examples of network architecture for realizing the embodiments of the disclosure, and the embodiments of the disclosure are not limited to the network structures illustrated in FIG. 1 and FIG. 2.

Figure 3:
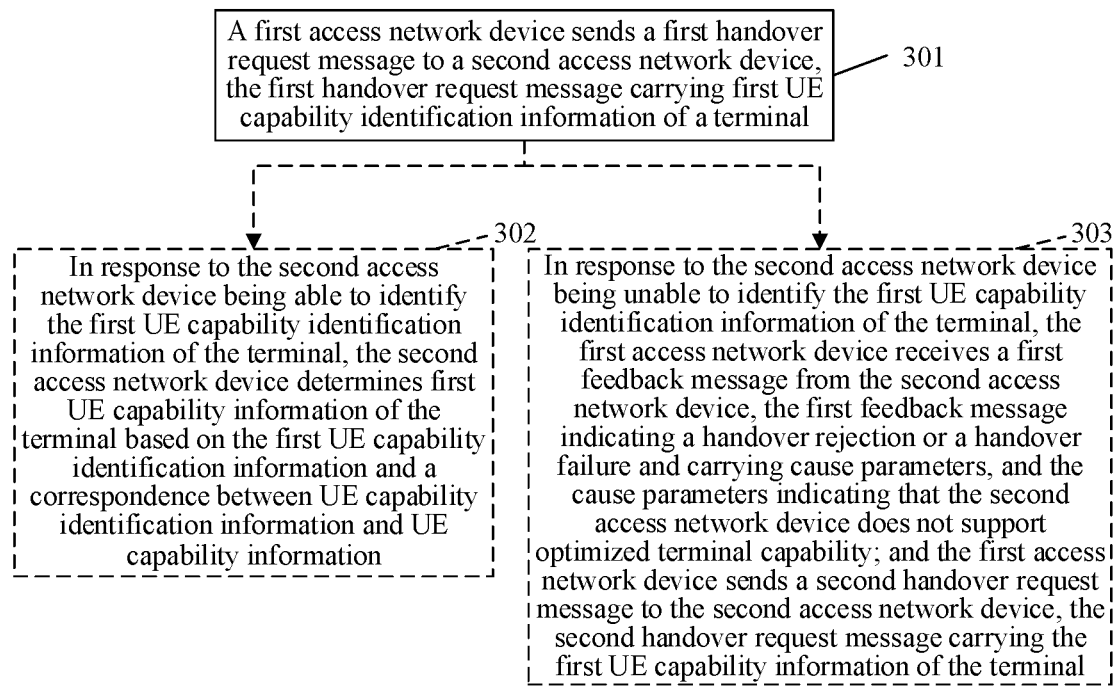
FIG. 3 is a first flowchart of a method for acquiring terminal capability according to an embodiment of the disclosure.

FIG. 3 is a first flowchart of a method for acquiring terminal capability according to an embodiment of the disclosure. As illustrated in FIG. 3, the method for acquiring terminal capability may include the following operations.

At S301, a first access network device sends a first handover request message to a second access network device, the first handover request message carrying first UE capability identification information of a terminal.

In the embodiments of the disclosure, the first access network device may be a source base station that serves the terminal, and the second access network device may be a target base station that serves the terminal. When moving, the terminal hands over from the source base station to the target base station. In this case, the source base station sends the first handover request message to the target base station, the first handover request message carrying the first UE capability identification information of the terminal.

Before this step, the first access network device receives a measurement report from the terminal, and determines, based on the measurement report, the second access network device to which the terminal is to be handed over.

In an implementation, before the first access network device sends the first handover request message to the second access network device, the first access network device acquires capability information about whether the second access network device supports an optimized terminal capability. 1) If the second access network device supports the optimized terminal capability, the first access network device sends the first UE capability identification information of the terminal through the first handover request message to the second access network device. 2) If the second access network device does not support the optimized terminal capability, the first access network device sends the first UE capability information of the terminal through a third handover request message to the second access network device. In this way, after the target base station receives the handover request message from the source base station, the UE capability information of the terminal can be acquired through this interaction.

In the embodiments of the disclosure, the method may further include operations illustrated in S302 and S303.

At S302, in response to the second access network device being able to identify the first UE capability identification information of the terminal, then the second access network device determines first UE capability information of the terminal based on the first UE capability identification information and a correspondence between UE capability identification information and UE capability information.

In the embodiments of the disclosure, the first UE capability information includes various capabilities supported by the terminal, such as Radio Access Type (RAT) supported by the terminal, bands supported by the terminal, power level of the terminal, whether the terminal supports CA, whether the terminal supports PS handover, and security algorithms supported by the terminal.

In the embodiments of the disclosure, the first UE capability identification information may be implemented in the following manners.

1) The first UE capability identification information of the terminal is first UE identification information of the terminal.

2) The first UE capability identification information of the terminal is identification information determined based on the first UE identification information of the terminal and specific identification information.

In an implementation, the first UE capability identification information of the terminal includes permanent identification information of the terminal or temporary identification information of the terminal.

In an implementation, the first UE capability identification information of the terminal is uniquely determined in at least one of the following: global scope, PLMN scope, core network device scope, access network device scope, and registration area. Further, the correspondence between the UE capability identification information and the UE capability information is determined based on PLMN. The first access network device or the second access network device may determine, according to a first PLMN registered or selected by the terminal, a correspondence, between UE capability identification information and UE capability information, corresponding to the first PLMN, so as to determine the first UE capability information corresponding to the first UE capability identification information of the terminal.

At S303, in response to the second access network device being unable to identify the first UE capability identification information of the terminal, the first access network device receives a first feedback message from the second access network device. The first feedback message indicates a handover rejection or a handover failure, the first feedback message carrying cause parameters, and the cause parameters indicating that the second access network device does not support the optimized terminal capability. The first access network device sends a second handover request message to the second access network device, the second handover request message carrying the first UE capability identification information of the terminal.

In an implementation, in response to the second access network device being unable to identify the first UE capability identification information of the terminal, the second access network device sends the UE capability request message to the core network device or the terminal, and receives the first UE capability information of the terminal from the core network device or the terminal. Further, when the second access network device sends the UE capability request message to the core network device or the terminal, the second access network device carries the first UE capability identification information of the terminal in the UE capability request message, so that the core network device or the terminal determines the first UE capability information of the terminal based on the first UE capability identification information and the correspondence between the UE capability identification information and the UE capability information.

In the above solutions of the embodiments of the disclosure, that the second access network device cannot identify the first UE capability identification information of the terminal means that: 1) the second access network device cannot parse the first handover request message to obtain the first UE capability identification information; or, 2) the second access network device can obtain the first UE capability identification information by parsing the first handover request message, but cannot determine the UE capability information corresponding to the first UE capability identification information.

Figure 4:
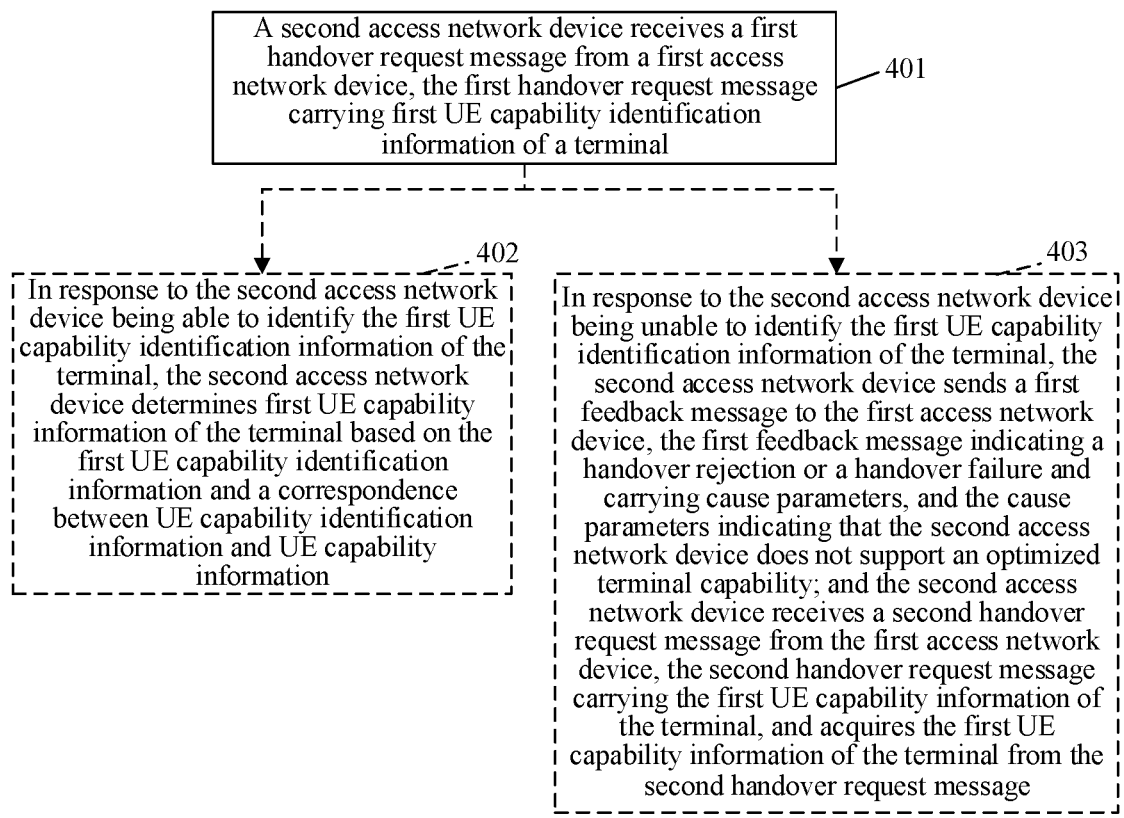
FIG. 4 is a second flowchart of a method for acquiring terminal capability according to an embodiment of the disclosure.

FIG. 4 is a second flowchart of a method for acquiring terminal capability according to an embodiment of the disclosure. As illustrated in FIG. 4, the method for acquiring terminal capability may include the following operations.

At S401, a second access network device receives a first handover request message from a first access network device, the first handover request message carrying first UE capability identification information of a terminal.

In the embodiments of the disclosure, the first access network device may be a source base station that serves the terminal, and the second access network device may be a target base station that serves the terminal. When moving, the terminal hands over from the source base station to the target base station. In this case, the source base station sends the first handover request message to the target base station, the first handover request message carrying the first UE capability identification information of the terminal.

In the embodiments of the disclosure, the method may further include operations illustrated in S402 and S403.

At S402, in response to the second access network device being able to identify the first UE capability identification information of the terminal, the second access network device determines first UE capability information of the terminal based on the first UE capability identification information and a correspondence between UE capability identification information and UE capability information.

In the embodiments of the disclosure, the first UE capability information includes various capabilities supported by the terminal, such as RAT supported by the terminal, frequency band supported by the terminal, power level of the terminal, whether the terminal supports CA, whether the terminal supports PS handover, and security algorithms supported by the terminal.

In the embodiments of the disclosure, the first UE capability identification information may be implemented in the following manners.

1) The first UE capability identification information of the terminal is first identification information of the terminal.

2) The first UE capability identification information of the terminal is identification information determined based on the first UE identification information of the terminal and specific identification information.

In an implementation, the first UE capability identification information of the terminal includes permanent identification information of the terminal or temporary identification information of the terminal.

In an implementation, the first UE capability identification information of the terminal is uniquely determined in at least one of the following: global scope, PLMN scope, core network device scope, access network device scope, and registration area. Further, the correspondence between the UE capability identification information and the UE capability information is determined based on PLMN. The first access network device or the second access network device may determine, according to a first PLMN registered or selected by the terminal, a correspondence, between UE capability identification information and UE capability information, corresponding to the first PLMN, so as to determine the first UE capability information corresponding to the first UE capability identification information of the terminal.

At S403, in response to the second access network device being unable to identify the first UE capability identification information of the terminal, the second access network device sends a first feedback message to the first access network device. The first feedback message indicates a handover rejection or a handover failure, the first feedback message carrying cause parameters, and the cause parameters indicating that the second access network device does not support the optimized terminal capability. The second access network device receives a second handover request message from the first access network device, the second handover request message carrying the first UE capability information of the terminal, and acquires the first UE capability information of the terminal from the second handover request message.

In an implementation, if the second access network device cannot identify the first UE capability identification information of the terminal, the second access network device sends the UE capability request message to the core network device or the terminal, and receives the first UE capability information of the terminal from the core network device or the terminal. Further, when the second access network device sends the UE capability request message to the core network device or the terminal, the second access network device carries the first UE capability identification information of the terminal in the UE capability request message, so that the core network device or the terminal determines the first UE capability information of the terminal based on the first UE capability identification information and the correspondence between the UE capability identification information and the UE capability information.

In the above solutions of the embodiments of the disclosure, that the second access network device cannot identify the first UE capability identification information of the terminal means that: 1) the second access network device cannot parse the first handover request message to obtain the first UE capability identification information; or, 2) the second access network device can obtain the first UE capability identification information by parsing the first handover request message, but cannot determine the UE capability information corresponding to the first UE capability identification information.

In the technical solutions of the embodiments of the disclosure, in response to the second access network device being unable to identify the first UE capability identification information of the terminal, the first access network device receives the first feedback message from the second access network device, the first feedback message indicating the handover rejection or the handover failure, the first feedback message carrying the cause parameters, and the cause parameters indicating that the second access network device does not support the optimized terminal capability; and the first access network device sends the second handover request message to the second access network device, the second handover request message carrying the first UE capability identification information of the terminal. The technical solutions of the embodiments of the disclosure are used to make the UE capability information correspond to the UE capability identification information. During handover, a source network sends the UE capability identification information of the terminal to a target network at first, so that the target network can acquire UE capability information corresponding to the UE capability identification information. In response to the target network does not support the optimized terminal capability, that is, the target network cannot identify the UE capability identification information provided by the source network, then the source network directly provides the UE capability information of the terminal to the target network; in this way, no matter whether the target network supports the optimized terminal capability, the UE capability information of the terminal can be acquired, thereby avoiding the handover failure, and minimizing the signaling overhead.

Figure 5:
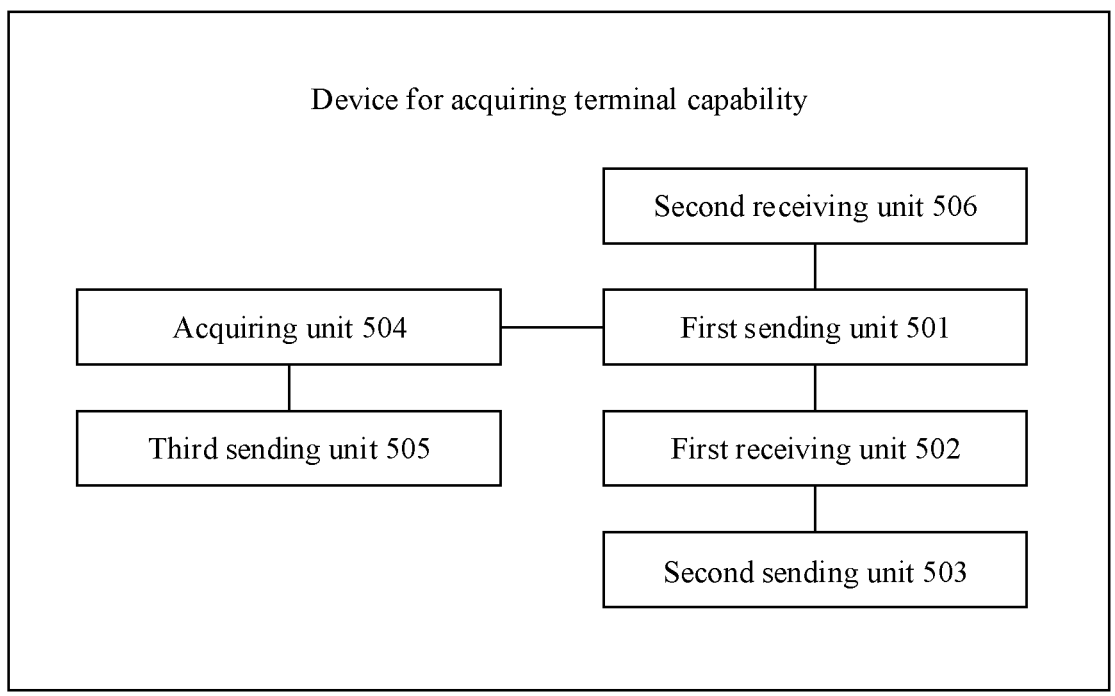
FIG. 5 is a first structural schematic diagram of a device for acquiring terminal capability according to an embodiment of the disclosure.

FIG. 5 is a first structural schematic diagram of a device for acquiring terminal capability according to an embodiment of the disclosure. As illustrated in FIG. 5, the device for acquiring terminal capability may include a first sending unit 501.

The first sending unit 501 is configured to send a first handover request message to a second access network device, the first handover request message carrying first UE capability identification information of the terminal.

In an implementation, the device may further include a first receiving unit 502 and a second sending unit 503.

The first receiving unit 502 is configured to receive, in response to the second access network device being unable to identify the first UE capability identification information of the terminal, a first feedback message from the second access network device, the first feedback message indicating a handover rejection or a handover failure, the first feedback message carrying cause parameters, and the cause parameters indicating that the second access network device does not support an optimized terminal capability.

The second sending unit 503 is configured to send a second handover request message to the second access network device, the second handover request message carrying first UE capability information of the terminal.

In an implementation, the device may further include an acquiring unit 504.

The acquiring unit 504 is configured to acquire, before the first access network device sends the first handover request message to the second access network device, capability information about whether the second access network device supports the optimized terminal capability.

The first sending unit 501 is configured to send, in response to the second access network device supporting the optimized terminal capability, the first UE capability identification information of the terminal through the first handover request message to the second access network device.

In an implementation, the device may further include a third sending unit 505.

The third sending unit 505 is configured to send, in response to that the second access network device does not support the optimized terminal capability, first UE capability information of the terminal through the third handover request message to the second access network device.

In an implementation, in response to the second access network device being unable to identify the first UE capability identification information of the terminal, the second access network device sends a UE capability request message to the core network device or the terminal, and receives first UE capability information of the terminal from the core network device or the terminal.

In an implementation, when the second access network device sends the UE capability request message to the core network device or the terminal, the second access network device carries the first UE capability identification information of the terminal in the UE capability request message, so that the core network device or the terminal determines the first UE capability information of the terminal based on the first UE capability identification information and the correspondence between UE capability identification information and UE capability information.

In an implementation, in response to the second access network device being able to identify the first UE capability identification information of the terminal, the second access network device determines the first UE capability information of the terminal based on the first UE capability identification information and the correspondence between the UE capability identification information and the UE capability information.

In an implementation, the device may further include a second receiving unit 506.

The second receiving unit 506 is configured to receive a measurement report from the terminal, and determine, based on the measurement report, the second access network device to which the terminal is to be handed over.

Those skilled in the art should understand that the implemented function of each unit in the device for acquiring terminal capability illustrated in FIG. 5 may be understood with reference to the related description of the method for acquiring terminal capability. The functions of each unit in the device for acquiring terminal capability illustrated in FIG. 5 may be realized through a program running in a processor, and may also be realized through a specific logical circuit.

Figure 6:
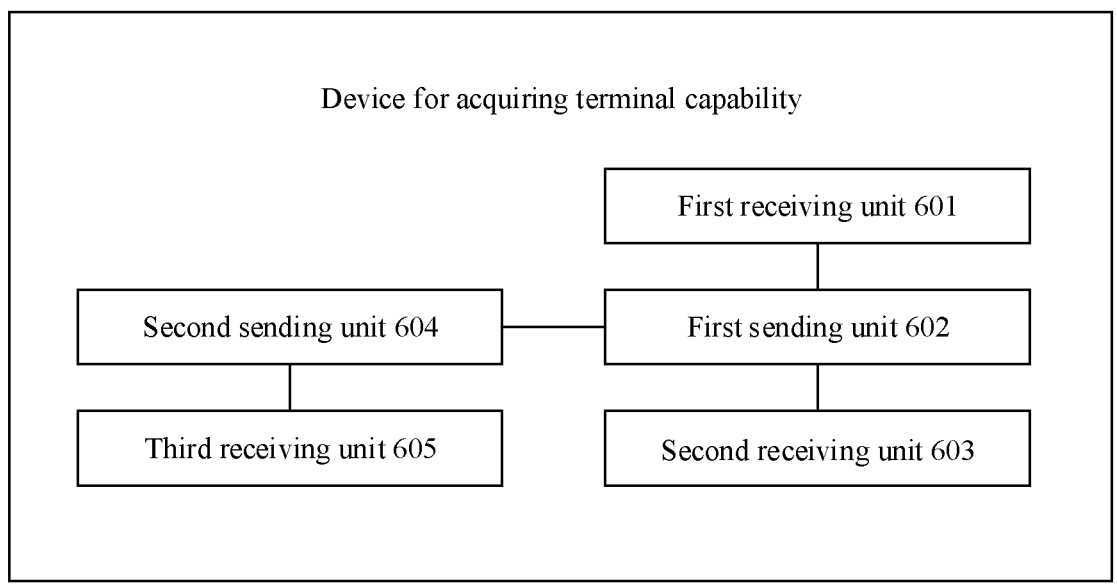
FIG. 6 is a second structural schematic diagram of a device for acquiring terminal capability according to an embodiment of the disclosure.

FIG. 6 is a second structural schematic diagram of a device for acquiring terminal capability according to an embodiment of the disclosure. As illustrated in FIG. 6, the device for acquiring terminal capability may include a first receiving unit 601.

The first receiving unit 601 is configured to receive a first handover request message from the first access network device, the first handover request message carrying first UE capability identification information of a terminal.

In an implementation, the device may further include a first sending unit 602 and a second receiving unit 603.

The first sending unit 602 is configured to send, in response to the second access network device being unable to identify the first UE capability identification information of the terminal, a first feedback message to the first access network device, the first feedback message indicating a handover rejection or a handover failure, the first feedback message carrying cause parameters, and the cause parameters indicating that the second access network device does not support an optimized terminal capability.

The second receiving unit 603 is configured to receive a second handover request message from the first access network device, the second handover request message carrying first UE capability information of the terminal, and acquire the first UE capability information of the terminal from the second handover request message.

In an implementation, the device may further include a second sending unit 604 and a third receiving unit 605.

The second sending unit 604 is configured to send, in response to the second access network device being unable to identify the first UE capability identification information of the terminal, a UE capability request message to the core network or the terminal.

The third receiving unit 605 is configured to receive the first UE capability information of the terminal from the core network or the terminal.

In an implementation, when the second sending unit 604 sends the UE capability request message to the core network device or the terminal, the second sending unit carries the first UE capability identification information of the terminal in the UE capability request message, so that the core network device or the terminal determines the first UE capability information of the terminal based on the first UE capability identification information and the correspondence between the UE capability identification information and the UE capability information.

In an implementation, the device may further include a determining unit (not shown in the drawings).

The determining unit is configured to determine, in response to the second access network device being able to identify the first UE capability identification information of the terminal, the first UE capability information of the terminal based on the first UE capability identification information and the correspondence between the UE capability identification information and the UE capability information.

Those skilled in the art should understand that the implemented function of each unit in the device for acquiring terminal capability illustrated in FIG. 6 may be understood with reference to the related description of the method for acquiring terminal capability. The functions of each unit in the device for acquiring terminal capability illustrated in FIG. 6 may be realized through a program running in a processor, and may also be realized through a specific logical circuit.

When being implemented in form of software functional module and sold or used as an independent product, the device for acquiring terminal capability of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, which stores computer-executable instructions thereon. The computer-executable instructions, when executed by a processor, cause the processor to perform the method for acquiring terminal capability provided by the embodiments of the disclosure.

Figure 7:
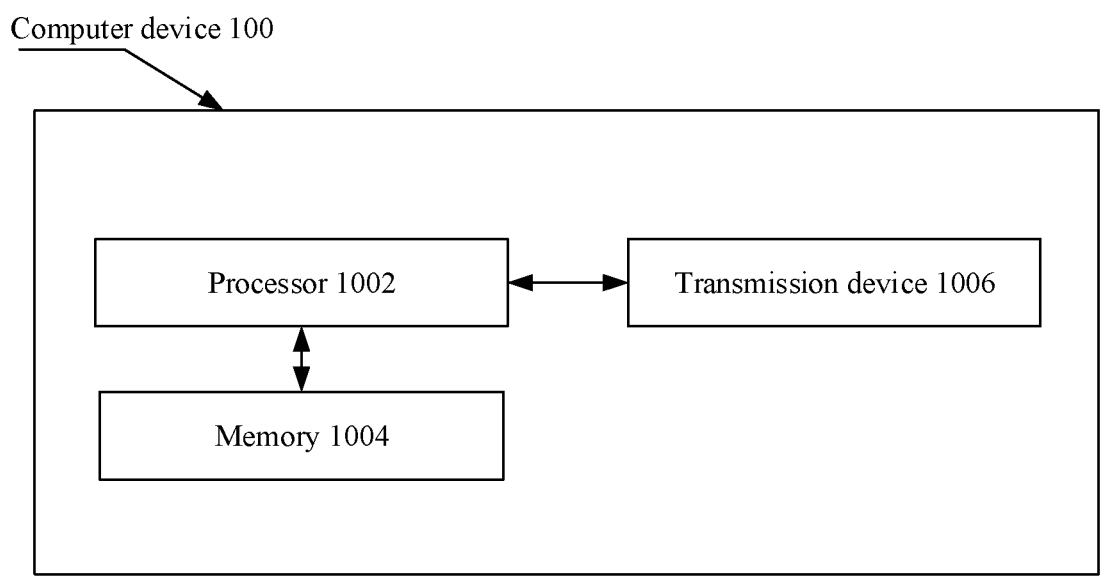
FIG. 7 is a structural schematic diagram of a computer device according to an embodiment of the disclosure.

FIG. 7 is a structural schematic diagram of a computer device according to an embodiment of the disclosure. The computer device may be a terminal. As illustrated in FIG. 7, the computer device 100 may include one or more (only one is shown in figure) processors 1002 (processor 1002 may include but not limited to a Micro Controller Unit (MCU) or a Field Programmable Gate Array (FPGA) and other processing devices), a memory 1004 for storing data, and a transmission apparatus 1006 for a communication function. Those of ordinary skill in the art should know that the structure shown in FIG. 7 is only schematic and not intended to limit the structure of the electronic device. For example, the computer device 100 may further include components more or fewer than the components shown in FIG. 7 or has a configuration different from that shown in FIG. 7.

The memory 1004 may be configured to store a software program of application software and a module, for example, program instructions/module corresponding to a resource allocation method in the embodiments of the disclosure. The processor 1002 runs the software program and module stored in the memory 1004, thereby executing various functional applications and data processing, namely implementing the above-mentioned method. The memory 1004 may include a high-speed random access memory and may also include a non-transitory memory, for example, one or more magnetic storage devices, flash memories or other non-transitory solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementations of the disclosure and not intended to limit the protection scope of the disclosure; any change or replacement that those skilled in the art can think of easily in the scope of technologies disclosed by the disclosure shall fall within the protection scope of the disclosure.

The invention claimed is:

1. A method for acquiring terminal capability, comprising:
   acquiring, by a first access network device, capability information about whether a second access network device supports an optimized terminal capability;
   in response to the second access network device supporting the optimized terminal capability, sending, by a first access network device, a first handover request message to a second access network device, wherein the first handover request message carries first UE capability identification information of a terminal, and in response to the second access network device being unable to identify the first UE capability identification information of the terminal, receiving, by the first access network device, a first feedback message from the second access network device, the first feedback message carries cause parameters indicating that the second access network device does not support an optimized terminal capability.

2. The method of claim 1, further comprising:
wherein the first feedback message indicates a handover rejection or a handover failure; and
sending, by the first access network device, a second handover request message to the second access network device, wherein the second handover request message carries the first UE capability identification information of the terminal.

3. The method of claim 1, further comprising:
in response to that the second access network device does not support the optimized terminal capability, sending, by the first access network device, the first UE capability information of the terminal through a third handover request message to the second access network device.

4. The method of claim 1, wherein
in response to the second access network device being unable to identify the first UE capability identification information of the terminal, sending, by the second access network device, a UE capability request message to a core network device or the terminal, and receiving, by the second access network device, first UE capability information of the terminal from the core network device or the terminal.

5. The method of claim 4, wherein when sending the UE capability request message to the core network device or the terminal, the second access network device carries the first UE capability identification information of the terminal in the UE capability request message, so that the core network device or the terminal determines the first UE capability information of the terminal based on the first UE capability identification information and a correspondence between UE capability identification information and UE capability information.

6. The method of claim 1, wherein
in response to the second access network device being able to identify the first UE capability identification information of the terminal, determining, by the second access network device, first UE capability information of the terminal based on the first UE capability identification information and a correspondence between UE capability identification information and UE capability information.

7. The method of claim 1, further comprising:
receiving, by the first access network device, a measurement report from the terminal, and
determining, based on the measurement report, the second access network device to which the terminal is to be handed over.

8. A method for acquiring terminal capability, comprising:
sending, by a second access network device, capability information about whether the second access network device supports an optimized terminal capability;
in response to the second access network device sending the optimized terminal capability, receiving, by the second access network device, a first handover request message from a first access network device, wherein the first handover request message carries first UE capability identification information of a terminal, and in response to the second access network device being unable to identify the first UE capability identification information of the terminal, sending, by the second access network device, a first feedback message to the first access network device, the first feedback message carries cause parameters indicating that the second access network device does not support an optimized terminal capability.

9. The method of claim 8, further comprising:
wherein the first feedback message indicates a handover rejection or a handover failure; and
receiving, by the second access network device, a second handover request message from the first access network device, wherein the second handover request message carries first UE capability information of the terminal, and acquiring the first UE capability information of the terminal from the second handover request message.

10. The method of claim 8, further comprising:
in response to the second access network device being unable to identify the first UE capability identification information of the terminal, sending, by the second access network device, a UE capability request message to a core network device or the terminal, and receiving, by the second access network device, first UE capability information of the terminal from the core network device or the terminal.

11. The method of claim 10, wherein when sending the UE capability request message to the core network device or the terminal, the second access network device carries the first UE capability identification information of the terminal in the UE capability request message, so that the core network device or the terminal determines the first UE capability information of the terminal based on the first UE capability identification information and a correspondence between UE capability identification information and UE capability information.

12. The method of claim 8, further comprising:
in response to the second access network device being able to identify the first UE capability identification information of the terminal, determining, by the second access network device, first UE capability information of the terminal based on the first UE capability identification information and a correspondence between UE capability identification information and UE capability information.

13. A device for acquiring terminal capability, comprising:
a processor, configured to acquire capability information about whether a second access network device supports an optimized terminal capability;
a transceiver, configured to:
in response to the second access network device supporting the optimized terminal capability, send a first handover request message to a second access network device, wherein the first handover request message carries first UE capability identification information of a terminal, and
in response to the second access network device being unable to identify the first UE capability identification information of the terminal, receive, a first feedback message from the second access network device, the first feedback message carries cause parameters indicating that the second access network device does not support an optimized terminal capability.

14. The device of claim 13, wherein the transceiver is further configured to:

wherein the first feedback message indicates a handover rejection or a handover failure; and send a second handover request message to the second access network device, wherein the second handover request message carries the first UE capability identification information of the terminal.

15. The device of claim 13, wherein the transceiver is further configured to:

send, in response to that the second access network device does not support the optimized terminal capability, the first UE capability information of the terminal through a third handover request message to the second access network device.

16. The device of claim 13, wherein in response to the second access network device being unable to identify the first UE capability identification information of the terminal, the second access network device sends a UE capability request message to a core network device or the terminal, and receives first UE capability information of the terminal from the core network device or the terminal.

17. The device of claim 16, wherein when sending the UE capability request message to the core network device or the terminal, the second access network device carries the first UE capability identification information of the terminal in the UE capability request message, so that the core network device or the terminal determines the first UE capability information of the terminal based on the first UE capability identification information and a correspondence between UE capability identification information and UE capability information.

18. The device of claim 13, wherein in response to the second access network device being able to identify the first UE capability identification information of the terminal, the second access network device determines first UE capability information of the terminal based on the first UE capability identification information and a correspondence between UE capability identification information and UE capability information.

* * * * *